United States Patent

[11] 3,628,433

| [72] | Inventors | Masao Takayama<br>Tokyo-to;<br>Kiyoyuki Arai, Gyoda, both of Japan |
|---|---|---|
| [21] | Appl. No. | 32,623 |
| [22] | Filed | Apr. 28, 1970 |
| [45] | Patented | Dec. 21, 1971 |
| [73] | Assignee | Kabushiki Kaisha Koparu<br>Tokyo-to, Japan |
| [32] | Priority | May 8, 1969 |
| [33] | | Japan |
| [31] | | 44/35338 |

[54] PHOTOGRAPHIC ELECTRONIC SHUTTER WITH POWER SWITCH CONTROL DEVICE
3 Claims, 2 Drawing Figs.

[52] U.S. Cl. ............................................. 95/53 EB,
95/10 CT
[51] Int. Cl. .................................................. G03b 9/08
[50] Field of Search ............................................ 95/53, 53 E,
53 EA, 53 EB, 58, 59, 10 C

[56] References Cited
UNITED STATES PATENTS
| 3,063,354 | 11/1962 | Matulik ........................ | 95/53 EL |
| 3,405,622 | 10/1968 | Anhouse ...................... | 95/53 |

Primary Examiner—John M. Horan
Assistant Examiner—Monroe H. Hayes
Attorney—Cushman, Darby & Cushman ABSTRACT: An electronic photographic shutter has an electromagnet which is energized upon closing of a power switch and is deenergized after the time controlled by a delay circuit has elapsed. A shutter-closing member is magnetically attracted to the electromagnet when the electromagnet is energized and is freed from the electromagnet to initiate closing of the shutter when the electromagnet is deenergized. A power switch-holding member is moved by the shutter release button of the camera into a position where it is held by the electromagnet until the electromagnet is deenergized.

PATENTED DEC 21 1971  3,628,433

INVENTORS
MASAO TAKAYAMA
KIYOYUKI ARAI
BY CUSHMAN, DARBY & CUSHMAN
ATTORNEYS 3,628,433

PHOTOGRAPHIC ELECTRONIC SHUTTER WITH POWER SWITCH CONTROL DEVICE

BACKGROUND OF THE INVENTION

1. Field of the Invention

The present invention relates to a photographic electronic shutter for controlling the amount of exposure by an electronic circuit, and more particularly to a photographic electronic shutter which is arranged in such a way that a power switch of the circuit is securely held in the closed position by an electromagnet connected with said electronic circuit for controlling the amount of exposure until the time controlled by said electronic circuit has elapsed.

2. Description of the Prior Art

In an electronic shutter for controlling the amount of exposure by an electronic circuit, ti is normal that, when a release button of the camera is depressed, a power switch of the circuit is closed at an initial stage of its releasing operation. Therefore, when manual depression is released from said release button before the time controlled by said electronic circuit has elapsed, said release button returns to its original position with said power switch being opened, so that controlling of the amount of exposure by said circuit terminates intermediately of such controlling.

There is a conventional shutter in which, in order to overcome the above-mentioned problem, a lock mechanism is provided to lock a power switch in its closed position and an arrangement is made wherein a shutter drive means causes the power switch to open by moving the lock mechanism through the motion that has effected the closing of the shutter. However, in order to release the locking of such lock mechanism, there was required a considerably large power. Further, unless the time at which the shutter drive mechanism contacts and moves said lock mechanism is after the complete closure of the shutter, there is an adverse affect of the characteristics of the exposure control. For this reason, a conventional mechanism of this type was accompanied by various difficulties such as those in adjusting the power to maintain the power switch of the lock mechanism and in positioning the contacting point of the shutter drive mechanism with respect to the lock mechanism.

Further, there is a conventional shutter in which a power switch is held without such a lock mechanism as described above being provided therein. Such an example is seen in U.S. Pat. No. 3,063,354. However, it is to be noted that, in said example, too, the movement of the drive mechanism is utilized to hold the power switch. Therefore, the characteristics of the exposure control are adversely affected as explained above.

SUMMARY OF THE INVENTION

An object of the present invention is to provide a photographic electronic shutter in which a power switch of an electronic circuit for controlling the amount of exposure is held in its closed position by a holding magnet until the time controlled by said electronic circuit has lapsed.

Another object of the present invention is to provide a photographic electronic shutter in which the releasing of the holding power of the power switch is achieved by deenergizing the holding magnet and not by any mechanical function of the shutter driving mechanism.

A further object of the present invention is to provide a photographic electronic shutter wherein a holding magnet which is connected to the electronic circuit and adapted to control the time of operation of a shutter driving mechanism is capable of holding the power switch in its closed position upon the closing of said power switch until the time controlled by said electronic circuit has elapsed.

DESCRIPTION OF THE PREFERRED EMBODIMENT

The present invention will be described herein in further detail with reference to the accompanying drawings.

Figure 1:
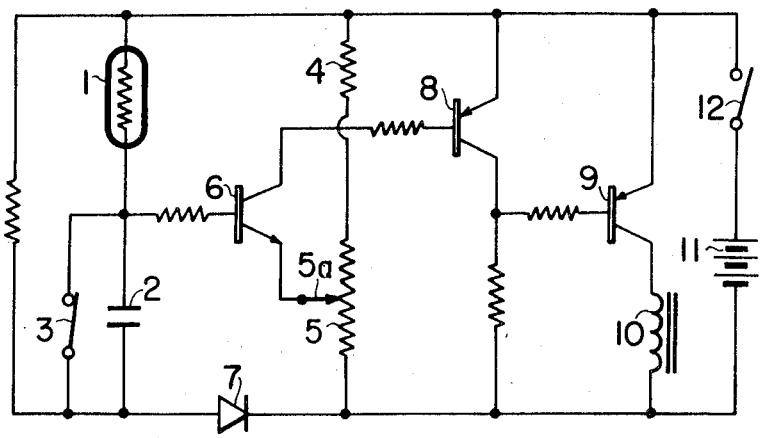
FIG. 1 is a circuit diagram showing an example of a circuit for controlling an electronic shutter.

In FIG. 1 of the drawings, the numeral 1 represents a photoconductive element disposed at the front of the camera. A capacitor 2 jointly with said photoconductive element 1 constitutes a delay circuit for controlling the time of the exposure. This delay circuit is actuated upon the opening of a switch 3. A resistor 4 and a potentiometer 5 determine the potential of the emitter electrode of a transistor 6. A sliding member 5a of the potentiometer 5 interlocks with a diaphragm-setting member and/or a film sensitivity-setting member so that the operator can adjust the resistance value of the potentiometer 5 before taking photographs. When this potentiometer is not used for establishing the factors of exposure such as that of the diaphragm aperture, it may be utilized for adjusting the circuit as manufactured. A diode 7 not only contributes to the temperature compensation of the transistor 6, but also contributes, especially when this transistor 6 is of a silicon type, with the potential of its base electrode being biased in advance, to effect an accurate switching by said transistor. The base electrode of a transistor 8 is connected with the collector electrode of the transistor 6, and the base electrode of a transistor 9 is connected with the collector electrode of the transistor 8. An electromagnet 10 is connected between the collector electrode of the transistor 9 and a power source 11. A power switch 12 is closed at the initial stage of the releasing operation of the camera.

Description will now be made of the operation of the circuit shown in FIG. 1. When the release button of the camera, which is not shown in the drawings, is depressed, the power switch 12 is closed at the initial stage of the depressing operation. At this time, the potential of the base electrode of the transistor 6 is lower than that of the emitter electrode thereof and, therefore, the transistor 6 is nonconductive. Thus the transistor 8 is nonconductive while the transistor 9 is conductive and the electric current flows through the electromagnet 10. Then, the electromagnet 10 attracts a shutter-closing member (described later) which is to start the closing motion of the shutter and holds said shutter-closing member in the position not to start such motion.

At the next stage of depressing operation of said release button, a shutter drive mechanism not shown in the drawings is released. Whereupon, the opening motion of the shutter commences, but at that time the switch 3 is caused to be opened by said drive mechanism. As the switch 3 opens, the capacitor 2 is charged through the photoconductive element 1. As a consequence, the potential of the base electrode of the transistor 6 rises. When the potential of the base electrode rises higher than that of the emitter electrode, the transistor 6 becomes conductive. Therefore, the transistor 9 becomes nonconductive so that the electric current does not flow to the electromagnet 10. The period of time from the moment when the switch 3 opens to the time when the transistor 6 becomes conductive varies in response to the brightness of the light incident upon the photoconductive element 1 from the scene being photographed. The electromagnet 10 loses its force to retain the shutter-closing member when the electric current ceases to flow to the electromagnet 10 and, as a result, said shutter-closing member moves by virtue of the counteracting force, thereby causing the shutter to initiate its closing motion.

As will be understood from the above description, what can happen in an electronic shutter with means to achieve such controlling of the time of exposure is that, if the power switch 12 opens before the transistor 6 is switched from the nonconductive to the conductive state by the delay circuit, the supply of electric current to the electromagnet 10 is stopped instantaneously, so that the motion to close the shutter is initiated. Therefore, it is necessary that the power switch 12 be kept securely closed until the transistor 6 becomes conductive and be opened without fail after the motion of closing the shutter stops.

Figure 2:
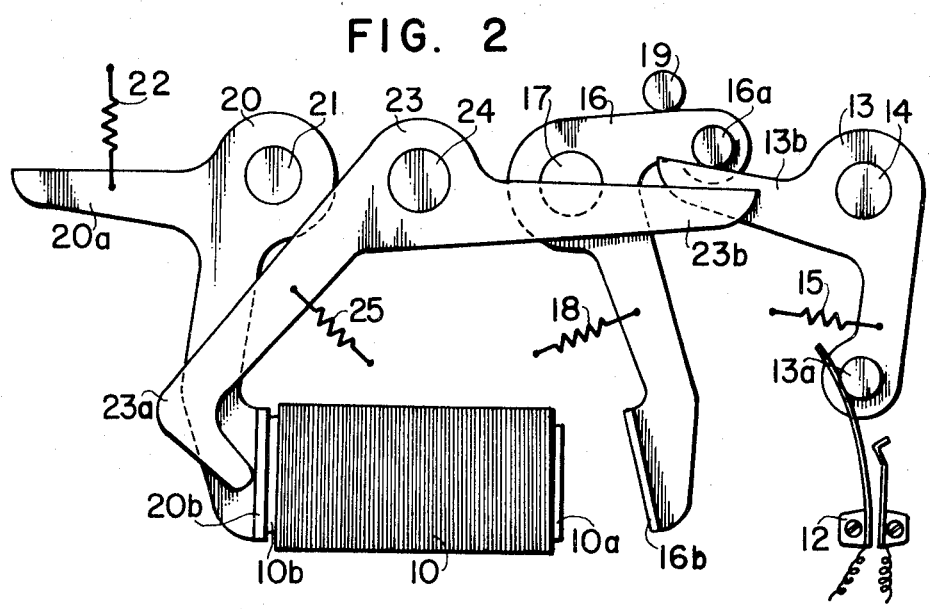
FIG. 2 is an explanatory representation showing an embodiment according to the present invention.

Next, one embodiment of the mechanism of the aforementioned type is hereunder described by referring to FIG. 2 of the drawings. The electromagnet 10 and the power switch 12 shown in FIG. 1 are illustrated in FIG. 2 with like reference numerals. This electromagnet 10 having pole portions 10a and 10b is fixed to a baseplate which is not shown.

A switching lever 13 has a pin 13a and an arm 13b and is pivotably mounted on a shaft 14 carried by the baseplate. A tension spring 15 is set in such a way that the switching lever 13 tends to rotate clockwise. In the state as shown in FIG. 2, said pin 13a is keeping the power switch 12 in its opened position, however, the power switch 12 is closed when the switching lever 13 rotates counterclockwise at the initial stage of depressing the release button of the camera.

A switch holding lever 16 has a pin 16a engageable with the arm 13b and a bent portion 16b. A tension spring 18 is provided so that the switch holding lever 16 tends to rotate clockwise. However, since the force of said spring 18 is weaker than that of said spring 15, the switch holding lever 16 is rotated counterclockwise by the switching lever 13 until it is stopped by a stopper 19 which is carried by the baseplate, as shown in FIG. 2

A shutter-closing lever 20 has an arm 20a and a bent portion 20b engageable with the magnet pole portion 10b and is pivotably mounted on a shaft 21 which is carried by the baseplate. A spring 22 is set so that the closing lever 20 is given the tendency to rotate clockwise. The closing lever 20 enables the shutter to initiate its closing motion through the arm 20a by being rotated clockwise from the position as shown in FIG. 2 by virtue of the action of the spring 22.

A press lever 23 has an arm 23a engageable with the bent portion 20b and an arm 23b engageable with the pin 16a and is pivotably mounted on a shaft 24 carried by the baseplate. A spring 25 is provided so that the press lever 23 is given the tendency to rotate counterclockwise. Since the force of said spring 25 is stronger than that of said spring 22, the arm 23a of the press lever 23 presses the bent portion 20b causing the closing lever 20 to rotate counterclockwise, so that the bent portion 20b is brought into engagement with the pole portion 10b of the magnet 10, as seen in FIG. 2.

Now, the operation of the mechanism shown in FIG. 2 will be explained. When the shutter button of the camera is depressed in the state as shown in FIG. 2, the switching lever 13 is rotated in the counterclockwise direction against the force of the spring 15 at the initial stage of such depressing operation. As a consequence, the power switch 12 is closed and thus electric current is supplied to the electromagnet 10.

When the switching lever 13 rotates in the counterclockwise direction, the switch holding lever 16 rotates clockwise by virtue of the spring 18. Consequently, the bent portion 16b is attracted by the pole portion 10a of the electromagnet 10. The switch-holding lever 16 presses the arm 23b by the pin 16a while rotating in the clockwise direction, causing the press lever 23 to also move in a clockwise direction against the force of spring 25. At this moment the bent portion 20b is already in contact with the pole portion 10b due to the magnetic attraction and, therefore, the shutter-closing lever 20 is not rotated by the spring 22.

Subsequently, when the shutter-driving mechanism (not shown in the drawings) is released by the shutter button of the camera, the opening motion of the shutter commences. At the initial stage of this motion, the switch 3 is opened rendering the delay circuit operational. When the depressing force given to the shutter button of the camera is freed while the exposure time of the shutter is being controlled by the delay circuit, the switching lever 13 tends to rotate in the clockwise direction by virtue of the spring 15. However, since the switch holding lever 16 is in contact with the electromagnet 10 by its force of attraction, the rotation of the switching lever 13 is prevented by the pin 16a and thus the power switch 12 remains in the closed position.

In FIG. 1, it is to be noted that, when the transistor 6 is switched 1 the delay circuit including the photoconductive element 1 and the capacitor 2 to cut off the electric current flowing to the electromagnet 10, the shutter-closing lever 20 is rotated clockwise by the action of the spring 22 and the closing motion of the shutter is started. Then, the switch-holding lever 16 is rotated counterclockwise against the force of the spring 18 by switching lever 13 and returns to the position as shown in FIG. 2. Therefore, the press lever 23 is rotated counterclockwise by the spring 25 causing the arm 23a to press the bent portion 20b with the closing lever 20 being rotated counterclockwise and returns to such position, the power switch 12 opens. On the other hand, the switch 3 closes and the charge on the capacitor 2 is discharged when the exposure operation of the shutter has been terminated or when the shutter-driving mechanism is again cocked.

Concerning the embodiment as shown in FIG. 2, there is some risk that, when the electric current being supplied to the electromagnet 10 is cutoff, the closing lever 20 may rotate clockwise and, prior to the commencement of the closing motion of the shutter, the press lever 23 may rotate counterclockwise causing the closing lever 20 to rotate counterclockwise. However, such a problem may be readily solved by the provision of some mechanical means. One of such means may be an arrangement wherein the arm 23b of the press lever 23 may be interlocked with the shutter-driving mechanism (not shown in the drawings) rather than with the pin 16a of the switch-holding lever 16. In such an arrangement, the press lever 23 may assume the position as shown in FIG. 2 when the shutter driving mechanism is cocked, and may rotate clockwise from the position as shown in FIG. 2 by the shutter-driving mechanism upon the initiation of the opening motion of the shutter. Alternatively, an arrangement may be made wherein, if the shutter comprises a means such as a sector ring which performs the exposure operation of the shutter by its reciprocal movements, the press lever 23 may be associated with the operation of such means so as to be rotated clockwise from the position as shown in FIG. 2 when the shutter is performing its opening motion, and to be restored to said position when the shutter is performing its closing motion.

Further, the switching lever 13 will not be required if it is arranged in such a way that the switch-holding lever 16 may rotate clockwise by utilizing the depression force imparted to the release button of the camera and the power switch 12 may be closed at the initial motion of such rotation in a clockwise direction.

While a circuit illustrated in FIG. 1 represents a typical example of an exposure control circuit adapted to be used in an electronic shutter, it is to be understood that the present invention may be embodied not only in an electronic shutter comprising the illustrated circuit, but also in many other types of electronic shutters. The present invention may be embodied both in focal plane shutters and lens shutters.

We claim:

1. A photographic electronic shutter with a power switch control device comprising:
   an electronic circuit for controlling the amount of exposure including a power switch to be closed at the initial stage of the releasing operation of a release button of the camera,
   an electromagnet connected to said electronic circuit to be energized upon the closing of said power switch and deenergized after the time controlled by said electronic circuit has elapsed,
   a shutter-closing means held by said holding magnet to initiate the closing motion of the shutter after the time controlled by said electronic circuit has elapsed, including press means to press said closing means so as to be brought into contact with said electromagnet and to release the pressure to said closing means after said electromagnet has been energized and said closing means has been attracted to said electromagnet, and
   a power switch-holding means to be actuated by the releasing operation of said release button with said power switch being closed at the initial stage of such operation and to be brought into contact with said holding magnet through the subsequent operation so as to be held by said holding magnet until the time controlled by said electronic circuit has elapsed.

2. A photographic electronic shutter with a power switch control device comprising:

an electronic circuit for controlling the amount of exposure including a power switch to be closed at the initial stage of the releasing operation of a release button of the camera, a holding magnet connected to said electronic circuit, a shutter-closing means held by said holding magnet to initiate the closing motion of the shutter after the time controlled by said electronic circuit has elapsed, and a power switch-holding means to be actuated by the releasing operation of said release button with said power switch being closed at the initial stage of such operation and to be brought into contact with said holding magnet through the subsequent operation so as to be held by said holding magnet until the time controlled by said electronic circuit has elapsed, including switching member to be actuated by the releasing operation of said release button and the close said power switch at the initial stage of such operation, and a switch-holding member to be actuated by said switching member so as to be brought into contact with said electromagnet after the closing of the power switch, thereby holding said switching member so that said power switch is in the state of closed position.

3. In a photographic camera having an electronic shutter, the improvement comprising:

an electronic circuit for timing an controlling the amount of exposure time including a power switch which is operated to begin timing said exposure time, a latching electromagnet connected to said electronic circuit and actuated by said electronic circuit after said power switch is manually operated and until said electronic circuit has timed said exposure time, a first pivotable mounted member having first and second arms, said first arm engaging said power switch so that said first member can be manually rotated about its pivot to operate said power switch, spring means urging said first member into a position not operating said power switch, a second pivotably mounted member having first and second arms with its first arm engaging said second arm o said first member and its second arm disposed adjacent said electromagnet so as to be attracted to said electromagnet and held in a latching position when said electromagnet is actuated so as to cause said first member to rotate to a position in which said power switch is operated, a third pivotably mounted member having an arm disposed adjacent said electromagnet so as to be attracted to said electromagnet, when said electromagnet is operated, and held in a first position, spring means urging said third member away from said electromagnet to a position which causes the shutter to close, a fourth pivotably mounted member having a first arm engaging said second member and a second arm engaging said third member so that, when said second member is in said latching position, said second arm is rotated to a position so as to permit said third member to rotate to a position closing said shutter when said electromagnet is no longer actuated, and spring means urging said fourth member to a position in which said second arm engages and holds said third member adjacent said electromagnet.

* * * * *